United States Patent [19]

Schwartz

[11] 4,372,291

[45] Feb. 8, 1983

[54] SOLAR HEAT EXCHANGER

[76] Inventor: David M. Schwartz, Washington, D.C.

[21] Appl. No.: 93,002

[22] Filed: Nov. 9, 1979

[51] Int. Cl.³ .................................................. F24J 3/02
[52] U.S. Cl. .................................. 126/443; 126/417; 126/438; 126/442
[58] Field of Search ............... 126/443, 438, 432, 417, 126/442

[56] References Cited

U.S. PATENT DOCUMENTS

| | | | |
|---|---|---|---|
| 1,068,650 | 7/1913 | Harrison | 126/443 X |
| 4,092,979 | 6/1978 | Kotlarz | 126/438 X |
| 4,124,020 | 11/1978 | Noble | 126/901 X |
| 4,136,670 | 1/1979 | Davis | 126/440 |
| 4,153,042 | 5/1979 | Tragert | 126/901 X |
| 4,186,724 | 2/1980 | Nelson | 126/443 |
| 4,237,868 | 12/1980 | Overton | 126/443 |

Primary Examiner—Larry Jones

[57] ABSTRACT

A solar heat exchanger for vaporizing virtually all the liquid entering the exchanger. The solar heat exchanger of the invention is comprised of a metal tube, a feedwater inlet tube of much smaller diameter located within the metal tube and a transparent glass envelope enclosing the metal tube. The annular space between the inner surface of the glass envelope and the outer surface of the metal tube is evacuated to pressure of $10^{-6}$ torr. A vapor outlet pipe is provided at one end of the exchanger. A feedwater inlet pipe extends from the opposite end of the exchanger within and for approximately the length of the interior of the metal tube. In use incoming feedwater is pumped through the feedwater pipe and sprays outwardly through small spray orifices onto the hot inside surface of the metal tube, which converts it to steam.

16 Claims, 7 Drawing Figures

SOLAR HEAT EXCHANGER

BACKGROUND OF THE INVENTION

1. Field of the Invention

The present invention relates to a solar type heat exchanger for converting incoming liquid to hot vapor.

2. Description of the Prior Art

In conventional prior art solar heat exchangers, a feed liquid entering the exchanger is normally either heated by sunlight energy to produce a non-boiling liquid at higher temperature or a percentage of the entering liquid is vaporized and the remainder accumulates and passes from the exchanger as a liquid. In the first type of solar heat exchanger commonly referred to as an indirect solar exchanger, the non-boiling liquid must be passed to a second (non-solar) conventional heat exchanger in which heat energy is transferred indirectly from the hot non-boiling liquid to another liquid such as water to vaporize the second liquid, so as to produce steam or other useful vapor. The disadvantage of this particular conventional type of system is that additional (non-solar) type indirect heat exchangers are required, thus adding to the cost and complexity of the sytem. On the other hand solar heat exchangers of the second type commonly referred to as insitu type exchangers disclosed in the prior art normally have a disadvantage of bulky design and lower heat transfer rate per unit tube surface area generally attributable to the greatly enlarged steam chamber required to accommodate the boiling liquid and steam produced within the exchanger. Another disadvantage of this latter type of solar heat exchanger is that in view of the reduced heat transfer rate only a portion of the incoming liquid is converted to vapor within the exchanger. The unconverted portion accumulates to form a liquid pool within the exchanger and excess liquid must be removed.

The present invention overcomes these disadvantages of the prior art solar heat exchangers by providing compact means for increasing the rate of heat transfer to the liquid passed into the exchanger so that virtually all incoming liquid is converted to steam or useful vapor within the solar exchanger itself without need for additional (non-solar) heat exchangers.

SUMMARY OF THE INVENTION

It is a principal object of the present invention to provide a compact solar heat exchanger for vaporizing a liquid by utilizing sunlight energy without resort to external heat sources.

It is also an object of the invention to provide a solar heat exchanger of compact design for converting water to steam within the solar exchanger itself without resort to additional heat exchangers or other heat transfer means.

It is an object of the invention to provide a solar heat exchanger which converts virtually all incoming water to steam without accumulation of a liquid pool within the exchanger.

The solar heat exchanger of the invention is comprised of a metal tube, a feedwater inlet tube of much smaller diameter located within the metal tube and a transparent glass envelope enclosing the metal tube. The metal tube is closed at each end. An opening is provided at one end of the metal tube for affixing a steam outlet pipe in communication with the interior of the metal tube. The steam outlet pipe is located approximately tangential to the side surface of the metal tube. A smaller opening is provided at the opposite end of the metal tube for insertion of a feedwater inlet pipe. The feedwater inlet pipe is located near the inner side wall surface of the metal tube and opposite the steam outlet pipe. The feedwater inlet pipe extends into the interior space of the metal tube traversing approximately the length of the interior space of the metal tube.

The feedwater inlet pipe is provided with small water spray holes along the length of the feedwater pipe. The small orifices are spaced uniformly along the pipe surface and are in close proximity to each other. Each orifice hole runs completely through the side wall surface providing a fluid outlet means therethrough from the interior of the feedwater pipe. As water is pumped through the feedwater pipe, the water passes through the spray orifices. The pressure of the water causes the water to spray out from the orifices and impact against the hot inside surface of the metal tube whereupon the water is completely vaporized before it reaches the bottom of the chamber. Thus, better heat transfer to the liquid is obtained by spraying the liquid against the hot inside surface of the metal tube than would otherwise occur if the liquid was simply passed into the tube interior space designated as the steam chamber. The wetting action of the inside metal tube surface by the spray means of the present invention permits virtually all the incoming water to be converted to steam so that essentially no liquid water pool accumulates within the exchanger. A sensing means within the metal tube interior space, i.e. within the steam chamber, is provided to regulate the flow of incoming water.

The present invention therefore provides an effective means for impacting the incoming feed liquid against the inside heat transfer surface of the steam chamber wetting the surface with a thin film thereby increasing the rate of heat transfer to the liquid. This feature coupled with the location of the feedwater inlet tube in relation to the steam outlet pipe and size of the steam chamber in relation to the feedwater inlet pipe produces enhanced steam production per unit heat transfer surface area and permits virtually all the incoming feed liquid to be converted to vapor without allowing a residual liquid pool to accumulate within the steam chamber.

DESCRIPTION OF THE PREFERRED EMBODIMENTS

Figure 1:
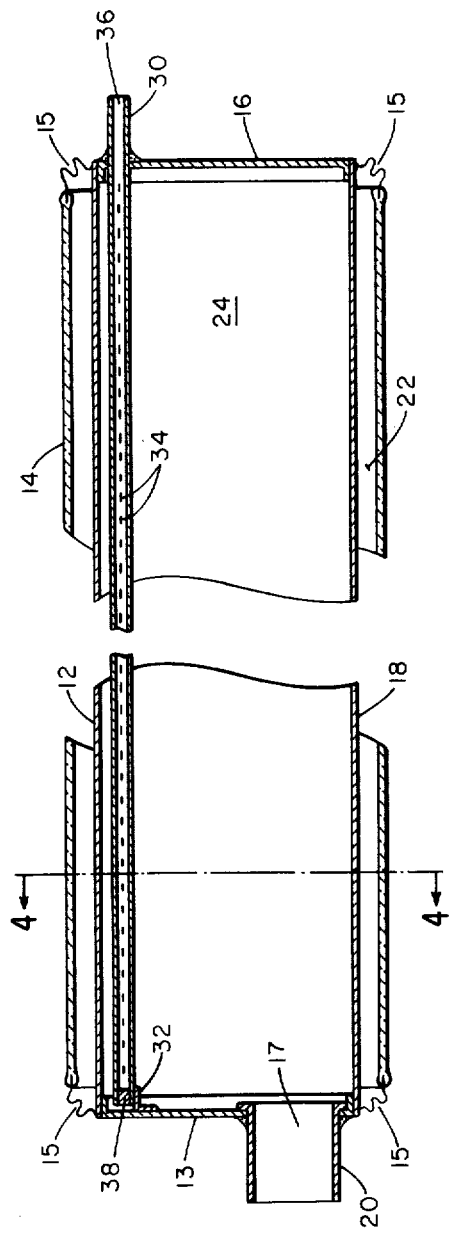
FIG. 1 is a sectional elevation view of a solar heat exchanger embodying the invention.
Figure 4:
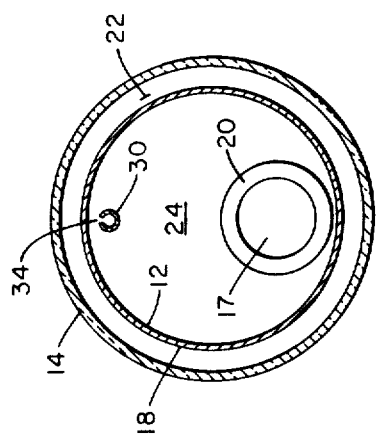
FIG. 4 is a sectional side view taken along the line 4—4 of FIG. 1.
Figure 3:
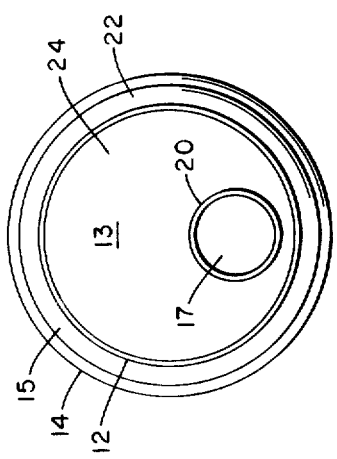
FIG. 3 is an end view looking from the left of FIG. 1.

A preferred embodiment of the solar heat exchanger of the invention is illustrated in FIG. 1. The steam solar exchanger 10 is comprised of a metal boiler tube 12, a feedwater inlet tube 30 of much smaller diameter located within the metal tube and a transparent glass envelope 14 enclosing the metal tube 12. The metal tube is constructed preferably of stainless steel coated with a suitable heat absorbtion coating such as black tungsten or black chrome on nickel. The metal boiler tube 12 is comprised of cylindrical side surface 18, a closed front metal end cap 13 and a closed rear metal end cap 16. The interior of tube 12 bounded by end caps 13 and 16 and side wall surface 18 defines a steam chamber 24. The front metal end cap 13 is provided with an opening 17 located nearly tangential to the end cap circumference as best illustrated in FIG. 3. A steam outlet pipe 20 is placed within opening 17 and welded to end cap 13 so that one end of the steam outlet pipe rests approximately flush against the inside surface of end cap 13 as illustrated in FIG. 1. The end cap 16 is provided with a small opening 31 near the circumferential edge of cap 16, nearly tangential to the metal tube side wall surface 18. The openings 17 and 31 are preferably displaced as far as possible from each other as best illustrated in FIG. 4.

The feedwater tube 30 is comprised of a straight pipe preferably of type 304 stainless steel construction having an open end 36 and a closed end 38. The feedwater tube 30 is provided with small holes or spray orifices 34 along the length of the tube. The small orifices approximately 0.005 inches to 0.050 inches in diameter are spaced uniformly along the tube surface about 0.1250 inches to 0.250 inches apart in close proximity to each other. Each small spray orifice may be made by simple drilling, saw cutting or laser burning of small holes through the tube 30 surface.

Figure 2:
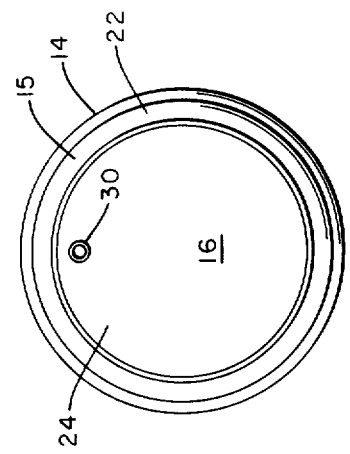
FIG. 2 is an end view looking from the right of FIG. 1.

Each orifice hole runs completely through the wall surface providing a fluid outlet means therethrough from the interior of tube 30. The tube 30 may be located within the metal boiler tube 12 by inserting the closed end 38 of tube 30 through opening 31 and aligning tube 30 approximately parallel to tube side surface 18. A bracket 32 affixed to the inner surface of end cap 13 is provided to secure the closed end 38 of the feedwater tube. Bracket 32 is aligned with opening 31 and placed sufficiently away from the circumferential edge of the end cap 14 so that the feedwater tube rests approximately parallel to the metal tube side wall surface 18. The feedwater tube surface is no closer than about 0.060 inches to the metal tube side wall surface 18. The open end 36 of the feedwater tube extends at least 0.50 inches through opening 31. The feedwater tube 30 may be welded to the peripheral edge of opening 31 to provide a permanent water tight seal securing the tube 30 to end cap 16. The preferred location of the feedwater tube 30 relative to the circumferential edge of end cap 16 is best illustrated in FIG. 2.

The glass envelope 14 encloses metal tube 12. The envelope 14 is preferably a transparent glass tube having an inside diameter about 0.250 to 0.80 inches larger than the outside diameter of metal tube 12 so that an annulus 22 of about 0.250 inches in width is formed around the metal tube. The annulus is defined by the metal tube outer surface and the glass envelope inner surface. The annulus space 22 is illustrated in FIGS. 1 through 3. The annulus space 22 is evacuated to a pressure of about $10^{-6}$ torr. Bellow seals 15 preferably of the type and construction disclosed in allowed U.S. Pat. application, Ser. No. 891,210 filed 3/29/78 are provided along the circumferential edge of each end of the glass tube 14. The bellows 15 are of metal construction preferably of ASTM 103 phosphor bronze or stainless steel.

Bellows 15 are sealed to metal tube 12 by a conventional glass to metal iron sealng alloy such as "Kovar" or "52 Alloy". The inner and outer peripheries of the bellows are longitudinally displaced from one another to better accommodate both differential radial and linear expansion of the metal and glass tubes. Preferably the outer periphery of the bellow is sealed in a glass to metal seal to the glass tube 14 and the inner periphery of the bellow is sealed to the metal tube 12 as disclosed in the above cited U.S. Pat. application, Ser. No. 891,210 filed 3/29/78.

In application sunlight heat energy passes through the transparent glass tube and is absorbed by the coated metal tube surface 18 thereby raising the temperature of the tube surface to about 600° F. without the use of mirrors or light concentrators. The vacuum annular space 22 prevents convective heat from escaping from the metal tube surface and the selective coating on the metal surface minimizes heat loss by infrared radiation. If light concentrating means such as mirrors or lenses are employed in addition to the evacuated annular space, the temperature of the metal tube surface 18 may reach to about 1200 F. As water at about 50 to 1500 psia pressure or other suitable fluid is pumped through feedwater tube 30, the fluid passes through the spray orifices 34. Water emanating from spray orifices 34 impacts against the inside metal wall surface of metal tube 12 whereupon it is converted to saturated steam. The steam passes from the interior chamber 24 through steam outlet pipe 20 and may be utilized in any service requiring low pressure steam approximately in a range between 20 to 200 psia.

A conventional immersion sensing device (not shown) within the chamber regulates the flow of feedwater through inlet tube 30 by controlling a variable feedwater valve. Virtually all the feedwater, i.e., at least 99.0% of the feedwater entering tube 30 and chamber 24 is converted to steam in chamber 24. Thus, virtually no liquid pool accumulates within chamber 24. The increased wetting effect of water sprayed under pressure through orifices 34 and impacting against the hot inside metal tube wall surface 18 coupled with the elongated design of chamber 24 in relation to inlet tube 30 permits increased heat transfer to occur than in conventional solar collector designs and virtually all of the incoming feed liquid is converted to vapor. The disadvantage in conventional solar heat exchangers which permit a residual liquid pool to accumulate within the chamber 24 is prevented. In view of the increased heat transfer obtained by employing the design of the present invention a higher liquid to vapor conversion rate is obtained than in conventional solar heat exchangers for the same metal surface area 18 available for heat transfer.

Figure 5:
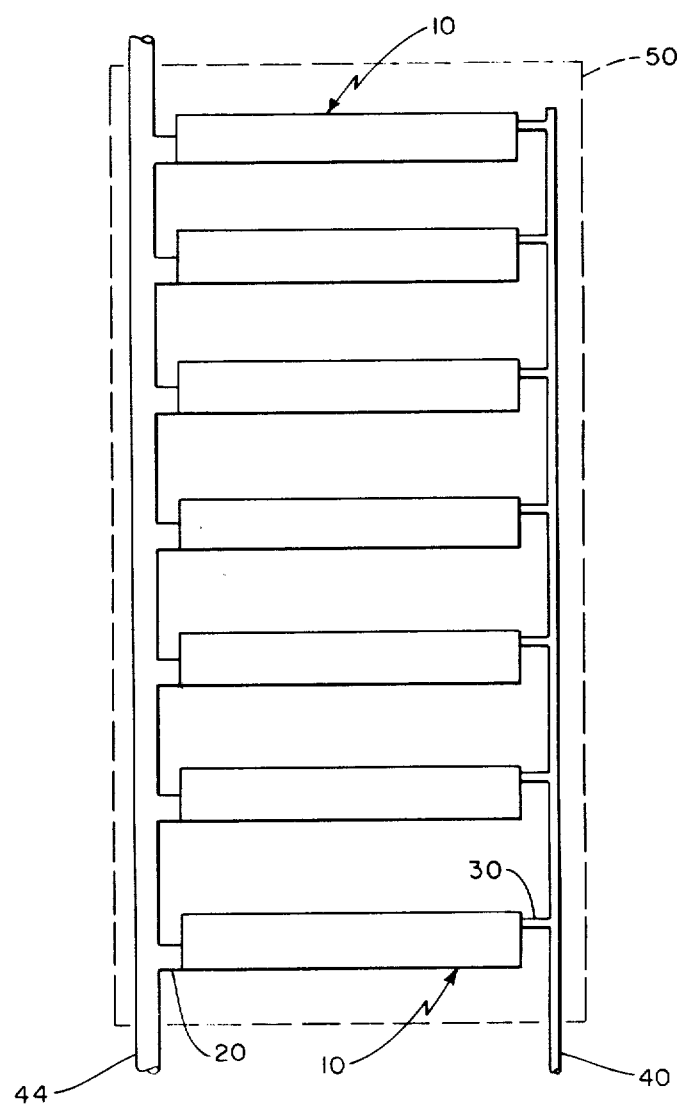
FIG. 5 is a plan view of one panel comprising a plurality of individual solar heat exchangers of the invention.

A plurality of solar heat exchangers 10 may be arranged in parallel to form one solar collector panel. A typical solar panel comprised of seven solar heat exchangers 10 of the present invention is illustrated in FIG. 5. The solar exchangers depicted in FIG. 5 have the inlet feedwater tube 30 connected to a common feedwater inlet manifold 40 and similarly the steam outlet pipe 20 emanating from each solar exchanger is connected to a common steam outlet manifold 44. Such design reduces the amount of piping needed both to carry water to the solar exchangers and to carry product steam from them. Also compacting a plurality of heat exchangers in a common space provides for better utilization of finite volume of space available and exposed to sunlight. A container 60 having a transparent cover 61 preferably of tempered low-iron glass transparent material is provided to house each panel 50 comprising a plurality of solar exchangers 10. The containers 10 each having a plurality (panel) of solar exchangers therein may be arranged in side by side pattern depicted in FIG. 6 to form an array of solar exchangers.

Figure 7:
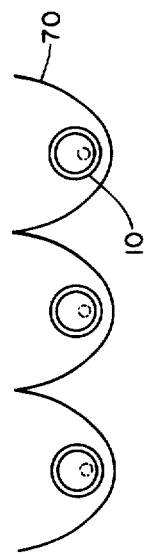
FIG. 7 is a sectional view taken along the line 7—7 of FIG. 6.

The panel of solar heat exchangers preferably employ 2X magnification non-imaging concentrating mirrors positioned at the base of each container 60 and partially circumventing each solar heat exchanger within the panel as best illustrated in FIG. 7. The use of non-imaging concentrating mirrors permits the tube metal surface 18 to reach a temperature as high as 1200° F. under average sunlight conditions of 275 BTU/ft$^2$.

Figure 6:
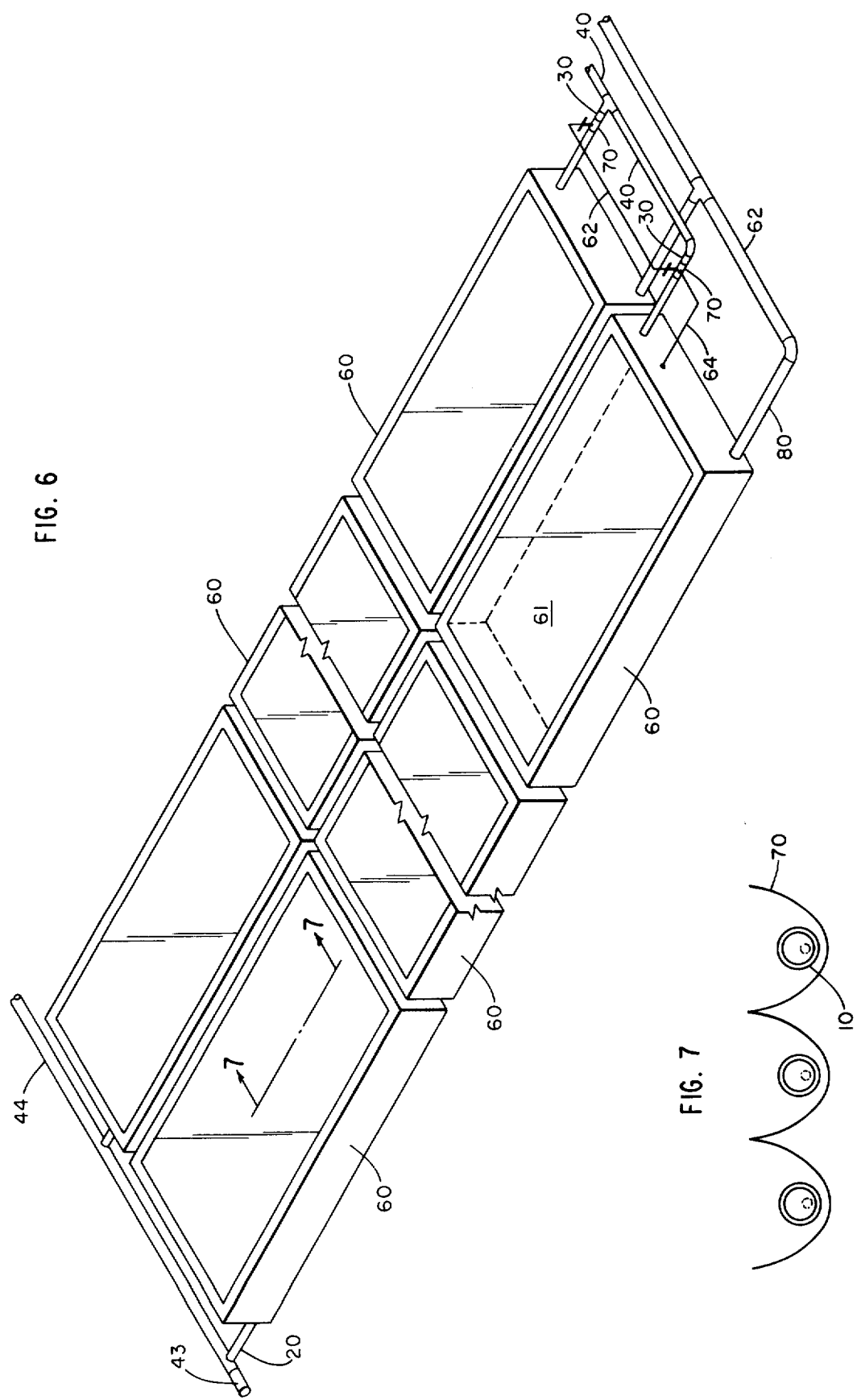
FIG. 6 is an isometric view of an array comprised of a plurality of panels.

The array of exchangers may be provided with common feedwater inlet manifold 30 and common steam outlet manifold 44 as illustrated in FIG. 6. An inlet feedwater tube 30 connected to common manifold 40 may be arranged to supply the plurality of solar heat exchangers within each panel. Each feedwater inlet manifold 30 is provided with a valve 70 and immersion sensing wire 64 connected to one solar exchanger chamber 24 per panel. The sensing wire 64 and valve 70 are thus adapted to control the rate of water to each panel. Any small amount of condensate which may be present within steam outlet pipe 20 may be removed from the system by condensate return line 80 connected to each steam outlet pipe.

Although the size dimensions for each solar heat exchanger, e.g., metal tube surface area available for heat transfer, steam chamber size and flow rate of incoming water may vary somewhat and yet be within the scope of the present invention the following specifications have been found to permit particularly favorable results: It has been determined that a particularly suitable design results when the solar exchanger of the invention is comprised of a metal tube 12 having an inside diameter of about 1¾ inches encased in a transparent glass tube having an inside diameter of about 2¼ inches, a feedwater inlet pipe about ⅛ inch inside diameter and a steam outlet pipe of about ½ inch inside diameter. The feedwater pipe is preferably constructed of type 304 stainless steel of 0.015 inches wall thickness. A suitable design length for the metal tube 12 having the aforementioned size dimensions may be about 48 inches. The metal tube 12 is preferably constructed of type 304 stainless steel having a wall thickness of 0.040 inches. Thus, the ratio of steam chamber 24 volume to metal surface area 18 of this preferred design is in a ratio of one-fourth the metal tube diameter or 0.44 in$^3$/in$^2$. It has been found that a solar heat exchanger of design illustrated in FIGS. 1-4 as described in the preferred embodiment and having the above-stated size dimensions permits a metal surface temperature of about 600° F. to be reached without employing mirrors or light concentrators and will permit conversion of about 0.173 lbs/hrs. of water at 50 psia to saturated steam. If light concentrators or mirrors are used with a magnification factor of 2.0X the metal surface 18 can reach a temperature as high as 1200° F. permitting conversion of 0.345 lbs/hr. of 50 psia water to saturated steam for a solar heat exchanger of the invention having the above-stated dimensions. Without the use of mirrors or other concentrators it has been determined that under average sunlight conditions of 275 BTU/FT$^2$, the present preferred embodiment having the above-stated dimensions may operate satisfactorily with a range in temperature difference ($\Delta T$) in a range of about 50° F. to almost 400° F. between the tube metal 12 surface temperature and the saturated steam temperature. For example, with the above stated size dimensions and a tube metal 12 surface temperature of about 600° F., about 0.05 ounces wt. per minute of water at 50 psia (sat. temp. 281° F.) may be converted to saturated steam with virtually no residual liquid pool accumulating within steam chamber 24.

An example of the operation of the preferred embodiment of the invention wherein the individual solar exchangers are arranged in panels (FIG. 5) and the panels grouped to form an array (FIG. 6) is given as follows:

An array comprised of 77 panels, with each panel comprising 7 solar heat exchangers of the present invention coupled to 2.0X non-imaging mirrors is arranged as illustrated in FIGS. 5 and 6. Thus, the array is comprised of 539 solar heat exchangers. The array of panels cover a surface area 57 feet in length and 44 feet 2 inches in width. The exposed surface area 61 of each panel to sunlight is approximately 26 square feet. Therefore, the total exposed surface area of the entire array of panels is about 2,000 feet$^2$. Each solar heat exchanger conforms to the foregoing preferred embodiment description. Each solar heat exchanger is comprised of a stainless steel metal tube 12 having a length of about 48 inches and inside diameter of about 1¾ inches encased in a transparent glass tube 14 having an inside diameter of about 2¼ inches and a feedwater inlet pipe of about ⅛ inch inside diameter and a steam outlet pipe of ½ inch inside diameter. The feedwater pipe is constructed of type 304 stainless steel and has a 0.015 inch wall thickness. The metal tube 12 and glass tube 14 are sealed by bellows 15. If concentrator mirrors of 2.0X magnification are used, then under average sunlight conditions of 275 BTU/FT$^2$, a tube metal 12 surface operating temperature of about 1200° F. can be reached in each solar exchanger. Water (or other suitable heat transfer liquid) is pumped into the feedwater inlet pipe at about 50 psia pressure and at about 90° F. at a rate of about 0.345 lbs/hr. per exchanger. Virtually all, i.e., greater than 99% of the incoming water, is converted to steam within the interior of the metal tube 12, i.e., within the chamber 24 of each solar exchanger.

Thus, the array of the present example occupying a total area of about 2500 feet$^2$ and comprising 539 solar heat exchanger tubes converts approximately 186 lbs/hr. of water at 50 psia pressure to saturated steam at about 50 psia (sat. temp. 281° F.) without the use of any other heat source other than average sunlight conditions of 275 BTU/FT$^2$. The steam may then be used for heating purposes or industrial use, for example, in the process of canning vegetable or in making paper or other uses where steam at the above-described rate, temperature and pressure is desirable.

Although the present invention has been described with reference to use of water as the heat transfer medium it should be understood that a variety of other heat transfer medium such as Fluorocarbons or ammonia may be used instead.

Also, although the present invention has been described with reference to a preferred embodiment it should be appreciated that variations of design are possible without departing from scope of the invention. Therefore, it is not intended that the invention be limited to the preferred embodiment described. Rather the scope of the invention to be determined by the scope of the claims and equivalents thereof.

What is claimed is:

1. A solar heat exchanger for vaporizing within the exchanger virtually all feed liquid heat transfer medium which enters the exchanger by utilizing solar light energy as the heating source, said solar heat exchanger comprising:
   a closed metal boiler tube wherein vaporization of feed liquid entering the exchanger occurs, said metal tube coated with heat absorbent coating and having an inlet opening for admitting the feed liquid into the metal boiler tube and an outlet opening for passing the vaporized product from the metal boiler tube,
   a transparent glass tube enclosing the metal tube and forming an annular space between the glass tube and the metal boiler tube, said annular space evacuated to vacuum pressure, and
   a spray tube of small diameter relative to the diameter of the metal boiler tube, said spray tube located within the metal boiler tube and having a plurality of spray orfices in close proximity to each other placed along the length of the spray tube, one end of said spray tube being in communication with said inlet opening of said metal boiler tube, said feed liquid entering said exchanger at a pressure sufficient to produce a continuous spray of said feed liquid through the spray orifices of said spray tube, said spray continuously impacting against the inside surface of said metal boiler tube to improve the rate of heat transfer to the feed liquid so that virtually all the liquid entering the metal boiler tube is converted to vapor within said metal boiler tube.

2. A solar heat exchanger as in claim 1 wherein the spray tube is open at the inlet end and closed at the opposite end, has a length approximately equal to the length of the metal boiler tube and is located in close proxmity to the inside wall surface of the metal boiler tube.

3. A solar heat exchanger as in claim 2 wherein the spray tube is approximately ⅛ inch in diameter and the spray orifices therein are approximately 0.0125 inches in diameter and spaced about 0.20 inches apart.

4. A solar heat exchanger as in claim 1 wherein the vapor outlet opening is located nearly tangential to the inside wall surface of the metal boiler tube.

5. A solar heat exchanger as in claim 4 wherein the vapor outlet opening has a diameter of about ½ inches and the heat exchanger includes an outlet pipe of approximately the same diameter as the outlet opening affixed to the circumferential edge defining said vapor outlet opening.

6. A solar heat exchanger as in claim 1 wherein the metal boiler tube has an inside diameter of approximately 1¾ inches and the transparent glass tube has an inside diameter of about 2¼ inches.

7. A solar heat exchanger as in claim 1 wherein the length of the metal boiler is approximately 48 inches.

8. A solar heat exchanger as in claim 7 wherein the wall thickness of the metal boiler tube is about 0.050 inches.

9. A solar heat exchanger as in claim 1 wherein the metal boiler tube and the spray tube are constructed of stainless steel.

10. A solar heat exchanger as in claim 1 wherein the metal boiler tube is constructed of copper.

11. A solar heat exchanger as in claim 1 wherein the liquid feed entering the exchanger is subcooled water at a pressure of about 50 psia and the vapor product is saturated steam at about 50 psia pressure.

12. A solar heat exchanger as in claim 1 wherein the water entering the heat exchanger is at a pressure of about 50 psia and a temperature of about 70° to 220° F.

13. A solar heat exchanger as in claim 1 wherein the metal boiler tube outer surface is coated with black chrome on nickel.

14. A solar heat exchanger as in claim 1 including non-imaging concentrating mirrors at least partially circumventing the transparent glass tube.

15. A solar heat exchanger as in claim 14 operating at a metal boiler tube surface temperature of about 1200° F. under average sunlight conditions.

16. A solar heat exchanger as in claim 1 operating at a metal boiler tube surface temperature of about 600° F. under average sunlight conditions.

* * * * *